US012684463B2

(12) United States Patent
Govindaraju et al.

(10) Patent No.: US 12,684,463 B2
(45) Date of Patent: Jul. 14, 2026

(54) SYSTEM AND METHOD FOR CUSTOMIZING BEACON PACKETS

(71) Applicant: ZEBRA TECHNOLOGIES CORPORATION, Lincolnshire, IL (US)

(72) Inventors: Vinod Govindaraju, Cumberland, RI (US); Harry W. Bock, Providence, RI (US); David S. Feldman, Fox River Grove, IL (US); Andrew J. Pekarske, Mundelein, IL (US); David A. Langevin, Warwich, RI (US); Matthew Christopher McNerney, Smithfield, RI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 59 days.

(21) Appl. No.: 18/385,579

(22) Filed: Oct. 31, 2023

(65) Prior Publication Data

US 2025/0142456 A1 May 1, 2025

(51) Int. Cl.
*H04W 48/10* (2009.01)
*H04W 72/0453* (2023.01)

(52) U.S. Cl.
CPC ....... *H04W 48/10* (2013.01); *H04W 72/0453* (2013.01)

(58) Field of Classification Search
CPC . H04W 48/10; H04W 72/0453; H04W 40/24; H04W 40/244; H04W 72/044; H04W 48/16
See application file for complete search history.

(56) References Cited

U.S. PATENT DOCUMENTS

| | | | | |
|---|---|---|---|---|
| 11,496,932 B2 * | 11/2022 | Huang | ..................... | H04W 4/80 |
| 11,751,030 B2 * | 9/2023 | Haverlag | ............... | H05B 47/19 |
| | | | | 455/41.2 |
| 2013/0065584 A1 * | 3/2013 | Lyon | ....................... | H04W 4/80 |
| | | | | 455/434 |
| 2015/0382150 A1 | 12/2015 | Ansermet et al. | | |
| 2016/0142856 A1 * | 5/2016 | Worrall | ................. | H04W 4/021 |
| | | | | 455/456.3 |
| 2017/0262739 A1 | 9/2017 | Lehotsky et al. | | |
| 2020/0137563 A1 * | 4/2020 | Bhattacharyya | ...... | H04W 24/10 |
| 2021/0051538 A1 * | 2/2021 | Huang | .................. | H04W 76/15 |
| 2021/0304555 A1 * | 9/2021 | Taylor | ................... | G06F 16/955 |

(Continued)

OTHER PUBLICATIONS

Gomes et al., "Adaptive and Beacon-based multi-channel protocol for Industrial Wireless Sensor Networks", Apr. 15, 2019, Journal of Network and Computer Applications, vol. 132, pp. 22-39, ISSN 1084-804, https://doi.org/10.1016/j.jnca.2019.01.025 (Year: 2019).*

(Continued)

*Primary Examiner* — Paul H. Masur

(57) ABSTRACT

An example device includes: a communications interface including a beacon; and a controller interconnected with the communications interface, the controller configured to: receive, via the communications interface, an initialization request including a beacon type; in response to the initialization request: obtain configuration data for the beacon type; and format a beacon packet according to the configuration data for the beacon type; and control the beacon to broadcast the beacon packet.

20 Claims, 4 Drawing Sheets

(56)  References Cited

U.S. PATENT DOCUMENTS

2022/0303890 A1    9/2022  Grandhi et al.
2022/0400361 A1*  12/2022  Haverlag  ................ H04W 4/50

OTHER PUBLICATIONS

PCT/US2024/053361—International Search Report, USPTO ISA/US, Jan. 17, 2025.
PCT/US2024/053361—Written Opinion of the International Searching Authority (ISA), USPTO ISA/US, Jan. 17, 2025.

* cited by examiner

100

104

112

108

110

116

300

SYSTEM AND METHOD FOR CUSTOMIZING BEACON PACKETS

BACKGROUND

Beacons may be used to broadcast beacon packets to be received by nearby devices. Different beacon communication protocols have defined different standards according to which the beacon packets are to be formatted. Accordingly, beacons operating to broadcast beacon packets in one standard are incompatible with receiving devices configured to interpret packets in a different standard.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
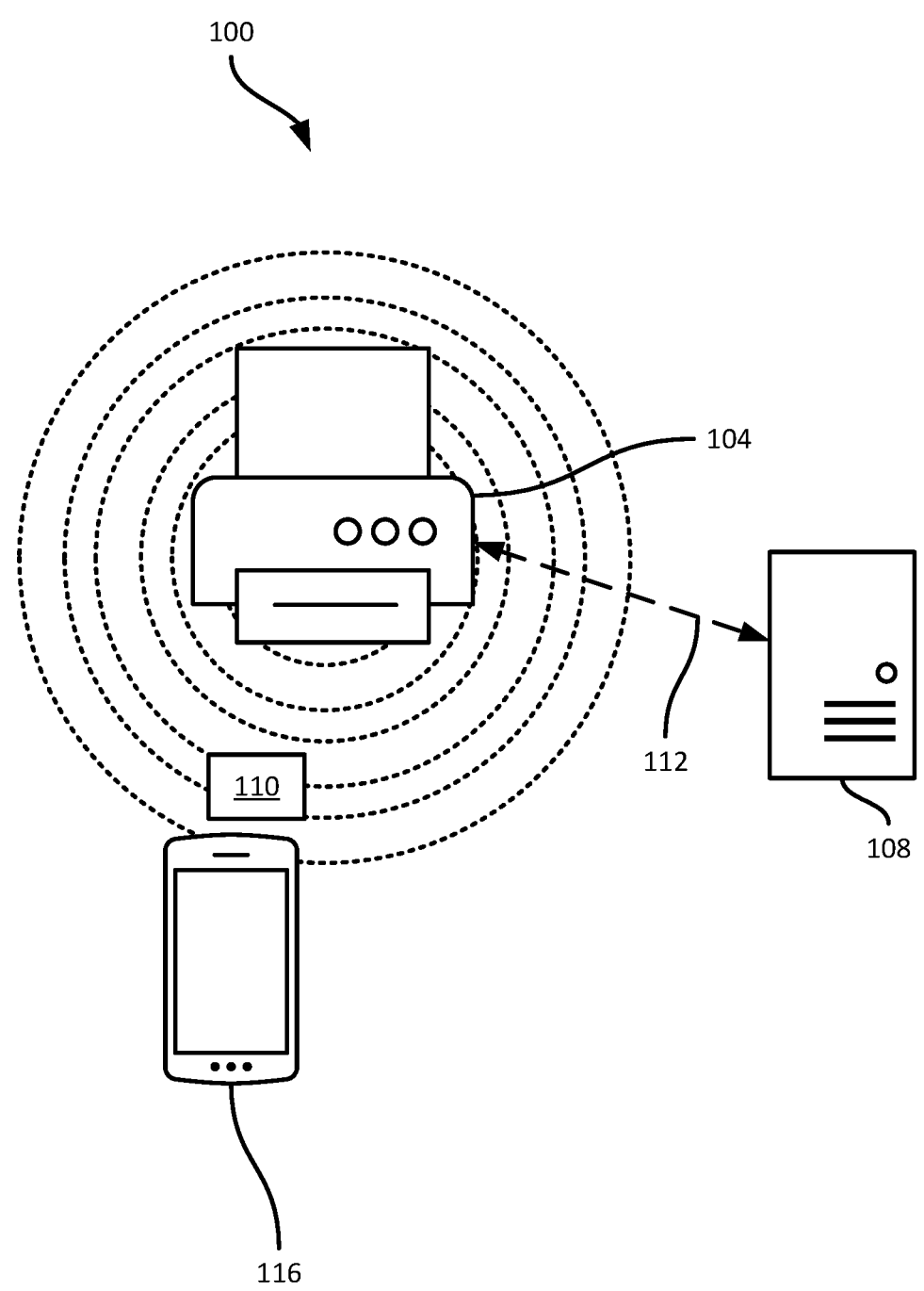
FIG. 1 is a schematic diagram of a system for customizing beacon packets.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Examples disclosed herein are directed to a device comprising: a communications interface including a beacon; and a controller interconnected with the communications interface, the controller configured to: receive, via the communications interface, an initialization request including a beacon type: in response to the initialization request: obtain configuration data for the beacon type; and format a beacon packet according to the configuration data for the beacon type; and control the beacon to broadcast the beacon packet.

Additional examples disclosed herein are directed to a method comprising: receiving an initialization request including a beacon type: in response to the initialization request: obtaining configuration data for the beacon type; and formatting a beacon packet according to the configuration data for the beacon type; and controlling the beacon to broadcast the beacon packet.

FIG. 1 depicts a system 100 for customizing beacon packets in accordance with the teachings of this disclosure. The system 100 includes a computing device 104 (also referred to herein as simply the device 104) interconnected with a configuration device 108.

The computing device 104 in the present example is illustrated as a printer, and in other examples may be another mobile device, such as a barcode scanner, a sensor, a wearable device, or the like, equipped with a beacon to broadcast a beacon packet 110, as described further herein. The configuration device 108 is a computing device such as a mobile computing device, including a phone, a tablet, or the like, or a fixed computing device, such as a server, a desktop computer, or the like.

The device 104 and the configuration device 108 may be in communication with one another to via a communication link 112, illustrated in the present example as including a wireless link. For example, the link 112 may be provided by a wireless local area network (WLAN) deployed by one or more access points (not shown). In other examples, the link 112 may be a short-range wireless communication link, such as a Bluetooth connection, a wired connection (e.g., via universal serial bus or USB connections or the like), combinations of the above, or the like.

In operation, the system 100 allows for beacon packet(s) 110 emitted by the device 104 to be customizable according to the environment in which the device 104 is operated. For example, the system 100 may further include one or more receiving devices 116, which may be, for example beacon receivers/locators (which may be distributed in a facility, e.g., mounted to a ceiling or other structure) and/or other mobile computing devices, including smart phones, tablets, mobile computers, and the like for operational purposes in the facility or environment in which the system 100 is deployed. The device 104 may therefore be customized according to the operating system used by the receiving device 116 within the facility.

For example, if the receiving device 116 is operated in a facility using primarily Apple devices, then the beacon packet 110 emitted by the device 104 may be formatted in the field according to iBeacon standards to allow the receiving device 116, to receive and process the beacon packet 110 emitted by the device 104. Similarly, the beacon packet 110 may be formatted in the field according to Eddystone, AltBeacon, or other proprietary standards which are utilized by the receiving device 116. The configuration device 108 may therefore configure the device 104 according to the operating system of the receiving device 116 when the device 104 is being deployed in the system 100 and allows for the device 104 to be reconfigured in the event that the beaconing protocol for the system is changed.

In particular, the device 104 may customize the broadcasted beacon packets 110 based on an initialization request received from the configuration device 108. For example, the initialization request may specify a beacon type and may additionally include configuration data for the beacon type. The device 104 may then apply the configuration data to the beacon packet 110, allowing the device 104 to format the beacon packet 110 in accordance with the specified standard for the beacon type.

Figure 2:
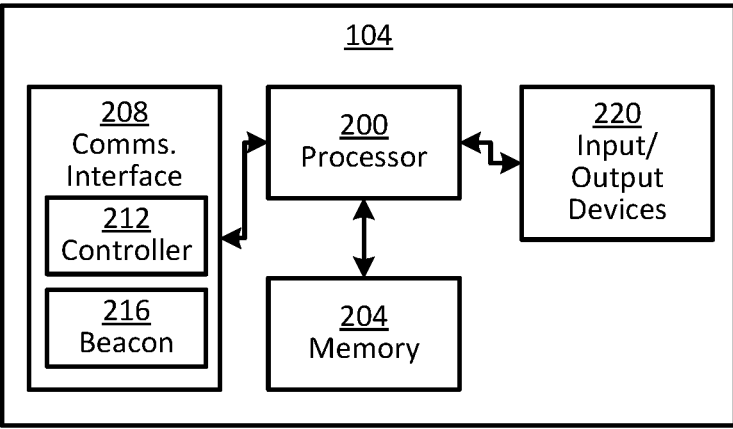
FIG. 2 is a block diagram of certain internal hardware components of the computing device of FIG. 1.

Turning now to FIG. 2, certain internal components of the device 104 are illustrated. The device 104 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits. The memory 204 stores computer-readable instructions for execution by the processor 200, including one or more applications which, when executed, configure the processor 200 to perform the various functions of the device 104.

The device 104 further includes a communications interface 208 enabling the device 104 to exchange data with other computing devices, such as the configuration device 108 or the receiving device 116. The communications interface 208 is interconnected with the processor 200. The communications interface 208 includes a controller 212, and one or more antennas, transmitters, receivers or the like to allow the device 104 to communicate with other computing devices such as the devices 108 and 116.

In particular, the communications interface 208 includes a beacon 216 configured to broadcast beacon packets 110 to be received by nearby devices, such as by the receiving device 116. The beacon 216 may operate, for example according to a Bluetooth Low Energy protocol, or other suitable wireless transmission protocol. The beacon 216 may utilize some or all of the same components of the communications interface 208, or the beacon 216 may include dedicated hardware (e.g., including a dedicated radio and/or antenna, a controller, etc.) for its broadcasting functionality.

The controller 212 may be a micro-controller, a microprocessor, or other suitable device or logic circuit capable of executing computer-readable instructions to control the components, such as the antennae, transmitters, receivers, and the like, of the communications interface 208 to perform the functionality described herein. The controller 212 may comprise one or more integrated circuits and may include and/or be interconnected with a non-transitory computer-readable storage medium storing computer-readable instructions which when executed configure the controller 212 and/or the communications interface 208 to perform the functionality described herein. In particular, the controller 212 may control the configuration of the beacon packets 110 and a subsequent broadcasting operation of the beacon 216.

In some examples, some or all of the configuration and/or broadcasting functions of the device 104 may be performed by the processor 200. For example, initialization of the configuration, the configuration parameters, broadcast parameters, and the like, may be received at the communications interface 208 and processed by the processor 200 via a predefined device configuration interface. In parsing the received request via the predefined device configuration interface, the processor 200 may transmit the request to the controller 212 for suitable configuration of the beacon 216. For example, the device 104 may be equipped with a Set-Get-Do (SGD) firmware and/or Zebra Programming Language (ZPL) firmware configured to receive SGD and/or ZPL configuration commands for generally configuring the device 104 for use. In other examples, the memory 204 may store an application executable by the processor 200 to process SGD and/or ZPL commands, JavaScript Object Notation (JSON) commands, and/or the like for generally configuring the device 104 for use.

The device 104 may further include one or more input and/or output devices (not shown) suitable to allow an operator to interact with the device 104. The input devices may include one or more buttons, keypads, touch-sensitive display screens or the like for receiving input from an operator. The output devices may further include one or more display screens, sound generators, vibrators, or the like for providing output or feedback to an operator.

Figure 3:
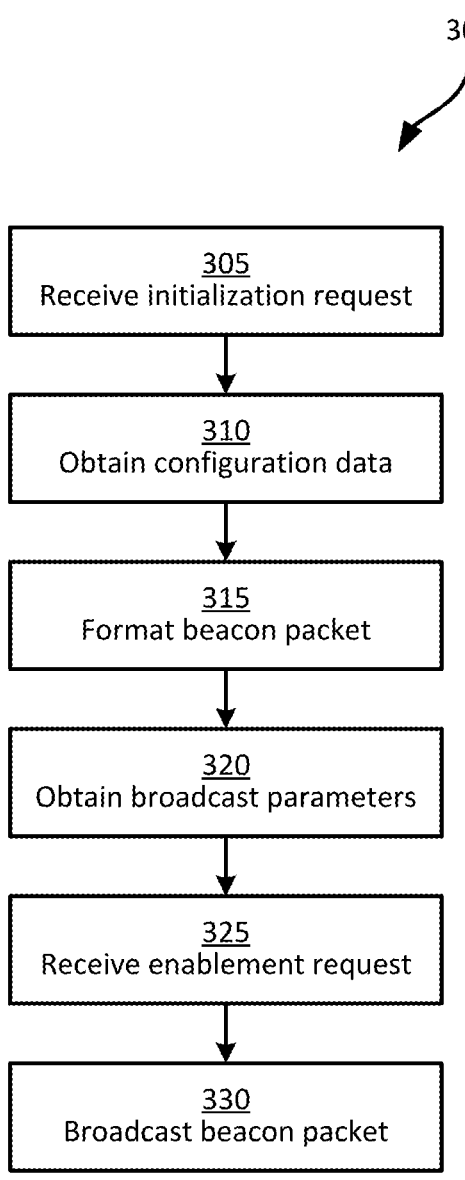
FIG. 3 is a flowchart of a method of customizing beacon packets.

Turning now to FIG. 3, the functionality implemented by the device 104 will be discussed in greater detail. FIG. 3 illustrates a method 300 of customizing a beacon packet. The method 300 will be discussed in conjunction with its performance in the system 100, and particularly by the device 104. In particular, the method 300 will be described with reference to the components of FIGS. 1 and 2. In other examples, the method 300 may be performed by other suitable devices or systems.

The method 300 is initiated at block 305, where the device 104 receives an initialization request, for example from the configuration device 108. In particular, the initialization request may be received via the communications interface 208. For example, the configuration device 108 may be in communication with the device 104 via Bluetooth communications, and hence the initialization request may be received via Bluetooth. In some examples, the initialization request may be received as a general configuration request for the device 104 (e.g., via an SGD command, a ZPL command or the like for configuring, for example, a Zebra printer). Accordingly, the processor 200 may process the configuration request and may pass the initialization request to the controller 212.

The initialization request may further specify a beacon type according to which the beacon packets 110 are to be formatted. For example, the initialization request may specify a particular beacon type (e.g., Eddystone, iBeacon, a proprietary custom beacon format, etc.), or the initialization request may indicate that a default beacon type is to be utilized.

At block 310, the device 104 obtains configuration data for the beacon type specified in the initialization request. For example, when the beacon type specified in the initialization request is a default beacon type, the device 104 may retrieve configuration data for the default beacon type from a memory of the device 104 (e.g., the memory 204 or a memory associated and/or integrated with the controller 212).

In other examples, the device 104 may receive the configuration data from the configuration device 108 or another suitable device. For example, the configuration data may be included in the initialization request or in another subsequent configuration request or message received from the configuration device 108. In particular, the configuration data may correspond to the format employed by the receiving device 116 to allow the receiving device 116 to receive and interpret the subsequently broadcasted beacon packet 110.

Figure 4:
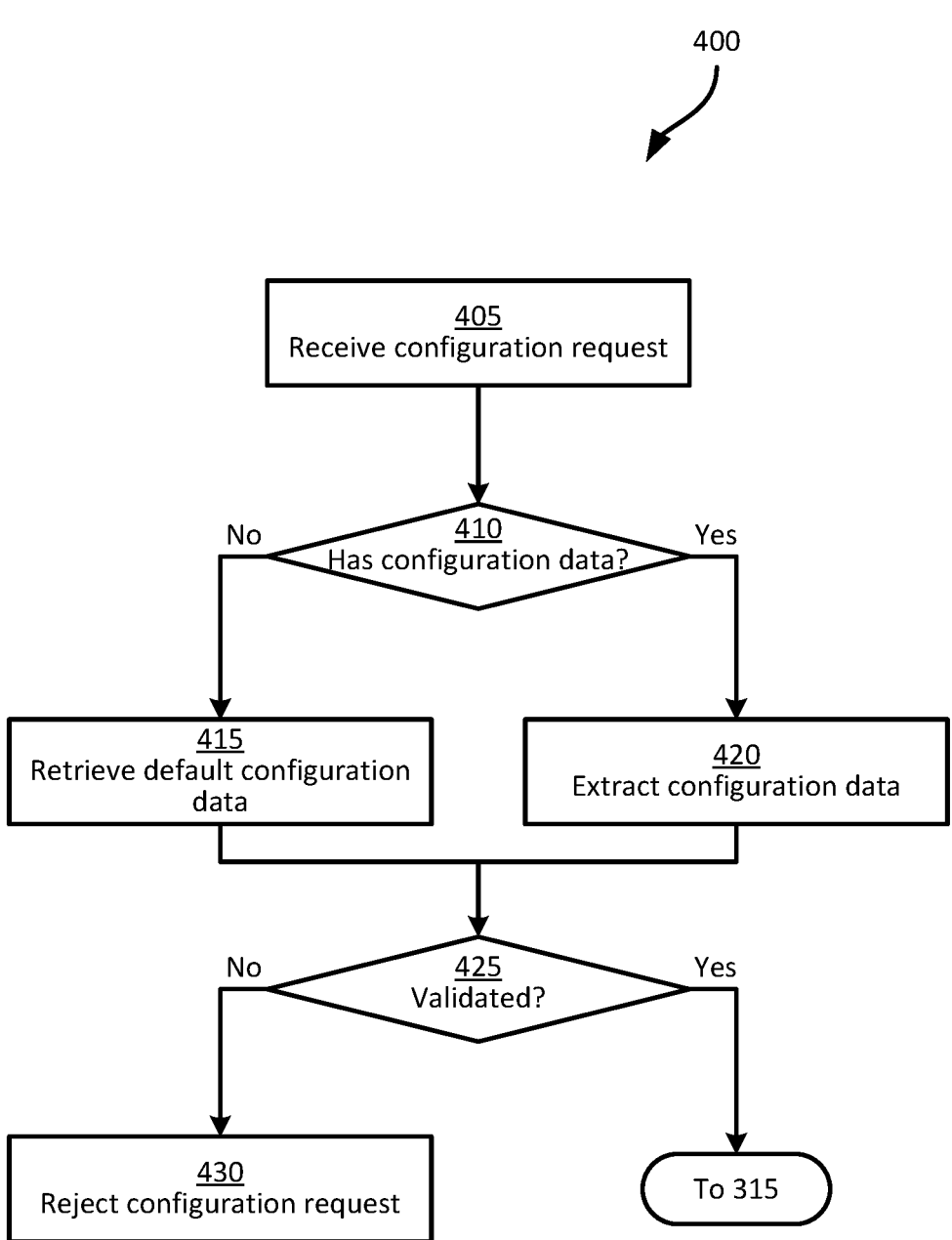
FIG. 4 is a schematic diagram of an example performance of block 310 of the method of FIG. 3.

Referring to FIG. 4, an example method 400 of obtaining the configuration data at block 310 is depicted.

At block 405, the device 104 may receive a configuration request including the configuration data from the configuration device 108, for example via the communications interface 208. For example, the configuration request may be received as an SGD or ZPL command or similar for generally configuring the device 104. The configuration request may be received in a length-type-value (LTV) format elements, where the request is divided into LTV elements, each of which has a length portion, a type portion, and a value portion. In the LTV element, the length portion specifies the length of the type and value portions, combined, the type portion specifies the type of data represented in the value field, according to predefined type codes (e.g., specified in the Bluetooth core specification, for Bluetooth messages), and the value represents the configuration data to allow the device 104 to configure the beacon packet 110 according to the beacon type. In some examples, the configuration request may include multiple LTV elements, for example specifying different types from the Bluetooth specification (or other suitable communications protocol used for broadcasting the beacon packet 110), and the corresponding configuration data with which the beacon packet 110 is to be formatted.

In some examples, the configuration device 108 may indicate that the default beacon type is to be used and/or that the default configuration data is to be retrieved from the memory by including blank configuration data in the configuration request. Accordingly, at block 410, the device 104 may determine whether the configuration request includes configuration data. For example, the device 104 may check whether value portion containing the configuration data is blank or empty, or whether an LTV element is included in the configuration request at all.

If, at block 410, the device 104 determines that no configuration data is included in the configuration request, then the device 104 proceeds to block 415. At block 415, the device 104 retrieves the default configuration data from memory.

If, at block 410, the device 104 determines that configuration data is included with the configuration request, then the device 104 proceeds to block 420. At block 420, the device 104 may extract the configuration data from the value portions of the LTV element(s) of the configuration request.

At block 425, the device 104 may validate the configuration data. For example, the device 104 may validate that the configuration data has an acceptable format (e.g., hexadecimal values), that it has an appropriate range and/or size (e.g., between 2 bytes to 28 bytes), that the type of the configuration data specified in the type portion is an allowed type (i.e., that the type in the communications protocol standard is permitted to be changed or configured), or other suitable validations.

If, at block 425, the device 104 determines that the configuration data has been validated, then the device 104 may return to the method 300, and more particularly, to block 315.

If, at block 425, the device 104 determines that the configuration data is not validated, that is, that there is some error or invalid parameter of the configuration data, then the device 104 proceeds to block 430. At block 430, the device 104 rejects the configuration request. In response to rejecting the configuration request, the device 104 may return an error message or the like to the configuration device 108, indicating the rejection and/or providing an indication of the error condition.

Returning now to FIG. 3, at block 315, the device 104 is configured to format the beacon packet 110 according to the configuration data obtained at block 310. The device 104 can be configured according to a specified beacon protocol and can reconfigured using the methods described in FIGS. 3 and 4 to change the beacon protocol to another beacon protocol as needed allowing for beacon of the device 104 to be customized at the time the device 104 is deployed and at any time after the device 104 has been deployed.

In some examples, the configuration data obtained at block 310 may be formatted according to the specified beacon type standard. For example, the value portion of a single LTV element received may correspond to the payload of the beacon packet 110. Thus, no additional changes may be applied to the value portion to format the beacon packet 110.

For example, when the beacon type is iBeacon, the beacon 216 is configured to broadcast advertising packets (i.e., having a Bluetooth specification type of 'FF'). Accordingly, the LTV element may specify a length of 1 A, a type of FF, and a value including a hexadecimal string defining a predefined iBeacon prefix (e.g., fixed according to the iBeacon standard), and a unique identifier for the device 104. Similarly, the value portion of other beacon types may specify a different prefix, other header types, codes, and other identifiers, and the like, according to the standard formatting for the beacon type.

In some examples, the prefixes, headers, and other formatting data, as well as the unique identifier for the device 104 may be specified by the configuration device 108 and inserted into the value portion of the LTV element as part of the configuration request, allowing the configuration data to be directly utilized in the beacon packet 110 for broadcasting by the beacon 216.

In other examples, the device 104 may prepend or append the prefix, headers, and other formatting data, and may insert the unique identifier. For example, the device 104 may combine more than one value portions of multiple received LTV elements to format the beacon packet 110 according to predefined rules stored at the device 104. The value portion of the LTV element may include a placeholder for the unique identifier for the device 104, to be replaced by the device 104.

The device 104 may further be configured to generate the unique identifier for the device 104 according to the beacon type standards for the selected beacon type. For example, AltBeacon employs a 20-byte unique identifier. The first 16 bytes are a unique identifier, which the device 104 may generate, for example based on the product name and the serial number of the device 104. The next 4 bytes may be subdivided into two 2-byte identifiers, which may have a default value, but which may otherwise be configured (for example based on configuration data received from the configuration device 108) according to the particular context of the device 104. The device 104 may then apply the unique identifier to the configuration data. In other example, generation of the unique identifier and application of the unique identifier to the configuration data may occur at the configuration device 108.

Thus, some or all of the parameters defined in the configuration data may be defined by the configuration device 108 and provided to the device 104. For example, the configuration device 108 may particularly be configured to provide contextual configuration parameters. Further, some of the parameters for finalizing the format of the beacon packet 110 may be inserted or updated by the device 104, such as device-specific parameters identifiable by the device 104.

At block 320, the device 104 may obtain broadcast parameters for broadcasting the beacon packet 110. The broadcast parameters may include an initiation condition, a stop condition, a beacon frequency, and the like.

For example, the initiation condition may specify a device condition detected by the device 104, in response to which the beacon 216 is configured to begin broadcasting the beacon packet. For example, the device condition may be a battery level of the device 104 being depleted to a threshold level, disconnection of a WLAN or other connection of the device 104, or other similar conditions. In other examples, the initiation condition may be to begin broadcasting immediately, or upon receipt of an enablement request as described below. The stop condition may specify a condition detected by the device 104, in response to which the beacon 216 is configured to stop broadcasting the beacon packet. For example, the stop condition may be a timeout condition, reconnection of the WLAN or other connection of the device 104, receipt of an explicit command at the device 104 or from another device, or other similar conditions. Other broadcast parameters may include the beacon frequency defining the transmission interval to balance power consumption of the beacon 216 and transmission frequency, the transmission power level for beacon transmission power, and other similar parameters.

In some examples, the beacon 216 and/or the communications interface 208 may be configured for another broadcasting or advertising function, for example in connection with the normal operations of the device 104. In such examples, the broadcasting parameters may include scheduling rules or similar to coordinate broadcasting of the beacon packet 110, and the device advertising functionality.

In some examples, the device 104 may obtain default broadcast parameters from a memory of the device 104 (e.g., the memory 204 or a memory associated and/or integrated with the controller 212). In other examples, the broadcast parameters may be received via the communications interface 208, for example as an SGD or ZPL command for generally configuring the device 104.

At block 325, the device 104 receives an enablement request to enable the beacon 216. In some examples, the fact of receiving the initialization request at block 305, and subsequently obtaining the configuration data at block 310 and/or the broadcast parameters at block 320 may serve as the enablement request at block 325. In other examples, the enablement request may be an independent request received via the communications interface 208. The enablement request may similarly be received as an SGD or ZPL command for generally configuring the device 104 and passed to the controller 212 for configuration of the beacon 216.

At block 330, in response to receiving the enablement request, the device 104 is configured to broadcast the beacon packet 110 in accordance with the broadcast parameters obtained at block 320.

For example, the device 104 may periodically check if the initiation condition has been met, by monitoring the battery level of the device 104, a WLAN or other connection, or the like. When the initiation condition is met, the controller 212 may control the beacon 216 to broadcast the beacon packet 110. Further, the controller 212 may control the beacon 216 to emit a beacon packet 110 at the transmission intervals (i.e., at the beacon frequency) defined in the broadcast parameters.

The beacon packet 110 may be received by the receiving device 116. Further, the receiving device 116 may be configured to interpret the beacon packet 110, since the beacon packet 110 is customized to a format recognizable by the receiving device 116. Accordingly, the receiving device 116 may identify the unique identifier of the device 104 and may further determine data such as signal strength of the signal received from the device 104, and the like. Thus, for example, if the initiation condition is the battery level of the device 104 dropping below a threshold level, the receiving device 116 may be configured to direct a user of the receiving device 116 to locate the device 104 to replace or recharge the battery. For example, the receiving device 116 may use the signal strength of the beacon packet 110, in conjunction with the signal strength of the beacon packet 110 as received by other nearby receiving devices 116 to triangulate the location of the device 104.

The controller 212 may further be configured to control the beacon 216 to stop emitting beacon packets 110 in response to detecting the stop condition. For example, upon locating the device 104, the user may provide an input to the device 104 to stop broadcasting. Alternately, the user may change the battery or plug the device 104 in for recharging, thereby triggering the stop condition.

Thus, as described above, the device 104, and more particularly the beacon 216 is configurable to emit customized beacon packets. This may allow for the device 104 and the beacon 216 to be compatible with and adaptable to a variety of different contexts, and allowing the beacon packets to be successfully received and interpreted by the receiving device 116 with minimal hardware modifications.

In the present example, the customizable beacon 216 is integrated into the device 104, and hence customization or configuration of the beacon 216 may occur via a configuration interface of the device 104. In other examples, the customization or configuration of the beacon 216 may occur via direct communications with the beacon 216. Further, in some examples, the beacon 216 may be an independent device, not integrated with another type of computing device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A device comprising:
a communications interface including a beacon; and
a controller interconnected with the communications interface, the controller configured to:
receive, via the communications interface, an initialization to configure the device with a beaconing protocol selected from a plurality of possible beaconing protocols based on an environment within which the device is configured to operate;
in response to the initialization request:
obtain configuration data for the beaconing protocol;
format a beacon packet according to the configuration data for the beaconing protocol; and
control the beacon to broadcast the beacon packet using the beaconing protocol.

2. The device of claim 1, wherein the controller is configured to receive a configuration request including the configuration data for the beaconing protocol.

3. The device of claim 2, wherein the configuration request comprises at least one length-type-value element including the configuration data.

4. The device of claim 1, wherein the controller is configured to obtain the configuration data from a memory of the device.

5. The device of claim 1, wherein the controller is configured to generate a unique identifier for the device and apply the unique identifier to the configuration data.

6. The device of claim 1, wherein the controller is further configured to:
obtain broadcast parameters; and
control the beacon to broadcast the beacon packet according to the broadcast parameters.

7. The device of claim 6, wherein the broadcast parameters comprise one or more of: an initiation condition; a stop condition; and a beacon frequency.

8. The device of claim 1, wherein the controller is further configured to:
receive an enablement request via the communications interface; and
control the beacon to broadcast the beacon packet in response to the enablement request.

9. The device of claim 1, wherein the initialization request is received as a configuration command for the device.

10. The device of claim 1, wherein the controller receives a further initialization request to reconfigure the device with a different beaconing protocol selected from the plurality of possible beaconing protocols based on a change in the environment within which the device is configured to operate; and
in response to the further initialization request:
obtain updated configuration data for the beaconing protocol;
format the beacon packet according to the updated configuration data for the beaconing protocol; and
control the beacon to broadcast the beacon packet using the different beaconing protocol.

11. A method for customizing beacon packets in a device, the method comprising:
receiving an initialization request to configure the device with a beaconing protocol selected from a plurality of possible beaconing protocols based on an environment within which the device configured to operate;
in response to the initialization request:
obtaining configuration data for the beaconing protocol; and
formatting a beacon packet according to the configuration data for the beaconing protocol; and
controlling a beacon to broadcast the beacon packet using the beaconing protocol.

12. The method of claim 11, further comprising receiving a configuration request including the configuration data for the beaconing protocol.

13. The method of claim 12, wherein the configuration request comprises at least one length-type-value element including the configuration data.

14. The method of claim 11, further comprising obtaining the configuration data from a memory of the device.

15. The method of claim 11, further comprising generating a unique identifier for the device and applying the unique identifier to the configuration data.

16. The method of claim 11, further comprising:
obtaining broadcast parameters; and
controlling the beacon to broadcast the beacon packet according to the broadcast parameters.

17. The method of claim 16, wherein the broadcast parameters comprise one or more of: an initiation condition; a stop condition; and a beacon frequency.

18. The method of claim 11, further comprising:

receiving an enablement request; and controlling the beacon to broadcast the beacon packet in response to the enablement request.

19. The method of claim 11, wherein the initialization request is received as a configuration command for the device.

20. The method of claim 11, further comprising:

receiving a further initialization request to reconfigure the device with a different beaconing protocol selected from the plurality of possible beaconing protocols based on a change in the environment within which the device is configured to operate; and in response to the further initialization request:

obtaining updated configuration data for the beaconing protocol;

formatting the beacon packet according to the updated configuration data for the beaconing protocol; and controlling the beacon to broadcast the beacon packet using the different beaconing protocol.

* * * * *